United States Patent

Okada et al.

[11] Patent Number: 6,138,974
[45] Date of Patent: Oct. 31, 2000

[54] SEAT SLIDE DEVICE FOR VEHICLES

[75] Inventors: Masaki Okada, Yotsukaichi; Toshihiro Kimura, Toyota; Yoshitaka Koga, Kariya, all of Japan

[73] Assignee: Aisin Seiki Kabushiki Kaisha, Kariya, Japan

[21] Appl. No.: 09/134,914

[22] Filed: Aug. 17, 1998

[30]         Foreign Application Priority Data

Aug. 18, 1997  [JP]  Japan .................................... 9-237750

[51] Int. Cl.[7] .................................................. F16M 13/00
[52] U.S. Cl. ........................................... 248/429; 297/330
[58] Field of Search .................................. 248/429, 430, 248/424, 422, 419; 297/330, 344.1; 74/89.15

[56]              References Cited

U.S. PATENT DOCUMENTS

| | | | |
|---|---|---|---|
| 4,802,374 | 2/1989 | Hamelin et al. | 74/89.15 |
| 5,150,872 | 9/1992 | Isomura | 248/429 |
| 5,222,402 | 6/1993 | White et al. | 74/89.15 |
| 5,259,257 | 11/1993 | Mouri | 74/89.15 |
| 5,267,717 | 12/1993 | Isomura | 248/430 |
| 5,273,242 | 12/1993 | Mouri et al. | 248/429 |
| 5,323,998 | 6/1994 | Aihara | 248/430 |
| 5,348,262 | 9/1994 | Isomura | 248/430 |
| 5,447,352 | 9/1995 | Ito et al. | 296/65.1 |
| 5,765,798 | 6/1998 | Isomura | 248/430 |
| 5,769,377 | 6/1998 | Gauger | 248/429 |
| 5,848,775 | 12/1998 | Isomura | 248/430 |

FOREIGN PATENT DOCUMENTS 5-37553  5/1993  Japan .

*Primary Examiner*—Ramon O. Ramirez
*Assistant Examiner*—Kimberly Wood
*Attorney, Agent, or Firm*—Burns, Doane, Swecker & Mathis, LLP

[57]                ABSTRACT

A seat slide device for seat position adjustment, comprising: a lower rail arranged on an installing portion of a vehicle body; an upper rail retaining the seat and adapted to move along the lower rail; and an electric motor, so that the position of the seat may be adjusted by the lower rail, the upper rail and the electric motor through a drive unit. Further comprised is a bracket which has the drive unit arranged and is retained by the upper rail while retaining one end of a screw member arranged movably in the lower rail. The bracket includes an abutment face for abutting against a shoulder portion of one end of the upper rail below the top face of the same.

16 Claims, 11 Drawing Sheets

SEAT SLIDE DEVICE FOR VEHICLES

BACKGROUND OF THE INVENTION

The present invention relates to a seat slide device to be used for adjusting seat position in vehicles.

In a conventional seat slide device (as disclosed in the Japanese Utility Model Laid-Open Publication No. Hei 5-37553), as shown in FIG. 11, the position of a seat sliding along a lower rail L arranged on the floor of a vehicle is adjusted by moving an upper rail U supporting the seat with respect to the lower rail L, by an operation of an electric motor through a drive unit K. A bracket B housing the drive unit K therein and retaining one end of a screw member S arranged in the lower rail L is fixed on the top face T of one end of the upper rail U by means of a plurality of bolts BT.

In this seat slide device of the prior art, a serious impact load is applied at a time of collision of the vehicle to the seat so that it has to be borne by a reduction gear mechanism of the drive unit K and by the bracket B and the screw member S.

As shown in FIG. 11, a distance h is made between a load F to act on the top face T of the upper rail U and a load F' to act on the screw member S, so that a cantilever support structure is made to apply the bending moment of F'·h to the bracket B. As a result, the bracket B may be deformed or broken, as shown in FIG. 12, when the serious load (e.g., a reaction at the time when the seat is moved in the longitudinal direction by the impact) acts from the seat at collision of the vehicle. In order to avoid this deformation or breakage of the bracket B, it is necessary to increase the thickness of the bracket B or to change the shape for enhancing the strength. This raises a problem to invite a large size or a high cost of the seat slide device.

SUMMARY OF THE INVENTION

Therefore, we have noted to reduce the bending moment to act on the bracket by reducing the distance between the load to act on the upper rail and the load to act on the screw member when the impact acts as at collision of the vehicle.

We have noted the technical concept of the invention to reduce the distance between the load to act on the upper rail and the load to act on the screw member by setting a portion closer to the screw member than the top face of the upper rail as a load acting point at which the bracket and the upper rail abut to apply the load to the upper rail. After investigations and developments, we have reached the invention having an object to make it unnecessary to thicken the bracket and change the shape for enhancing the strength thereby to prevent a large size and a high cost by reducing the bending moment to act on the bracket.

According to the invention, there is provided a seat slide device for seat position adjustment, comprising: a lower rail arranged on an installing portion of a vehicle body; an upper rail retaining the seat and adapted to move along the lower rail; an electric motor, so that the position of the seat may be adjusted by the lower rail, the upper rail and the electric motor through a drive unit; and a bracket having the drive unit arranged and retained by the upper rail while retaining one end of a screw member arranged movably in the lower rail, the bracket including an abutment face for abutting against a shoulder portion of one end of the upper rail below the top face of the same.

A seat slide device thus constructed according to the invention for the seat position adjustment: a lower rail arranged on a floor of a vehicle; an upper rail retaining the seat and adapted to move along the lower rail; and an electric motor, so that the position of the seat may be adjusted by the lower rail, the upper rail and the electric motor through a drive unit. The abutment faces, which are formed at the bracket having the drive unit and retained by the upper rail while retaining one end of the screw member arranged movably in the lower rail and having the reduction gear mechanism arranged therein as the drive unit, are made to abut against the shoulder portion of the upper rail belong the top face of one end of the same thereby to exert the load to the upper rail. As a result, the distance to be contained between the load to act on the upper rail and the load to act on the screw member is reduced so that the bending moment to act on the bracket is reduced to make it unnecessary to thicken the bracket or to change the strength enhancing shape of the same. Thus, there is achieved an effect to prevent the large size and the high cost of the bracket.

DESCRIPTION OF THE PREFERRED EMBODIMENTS

Figure 1:
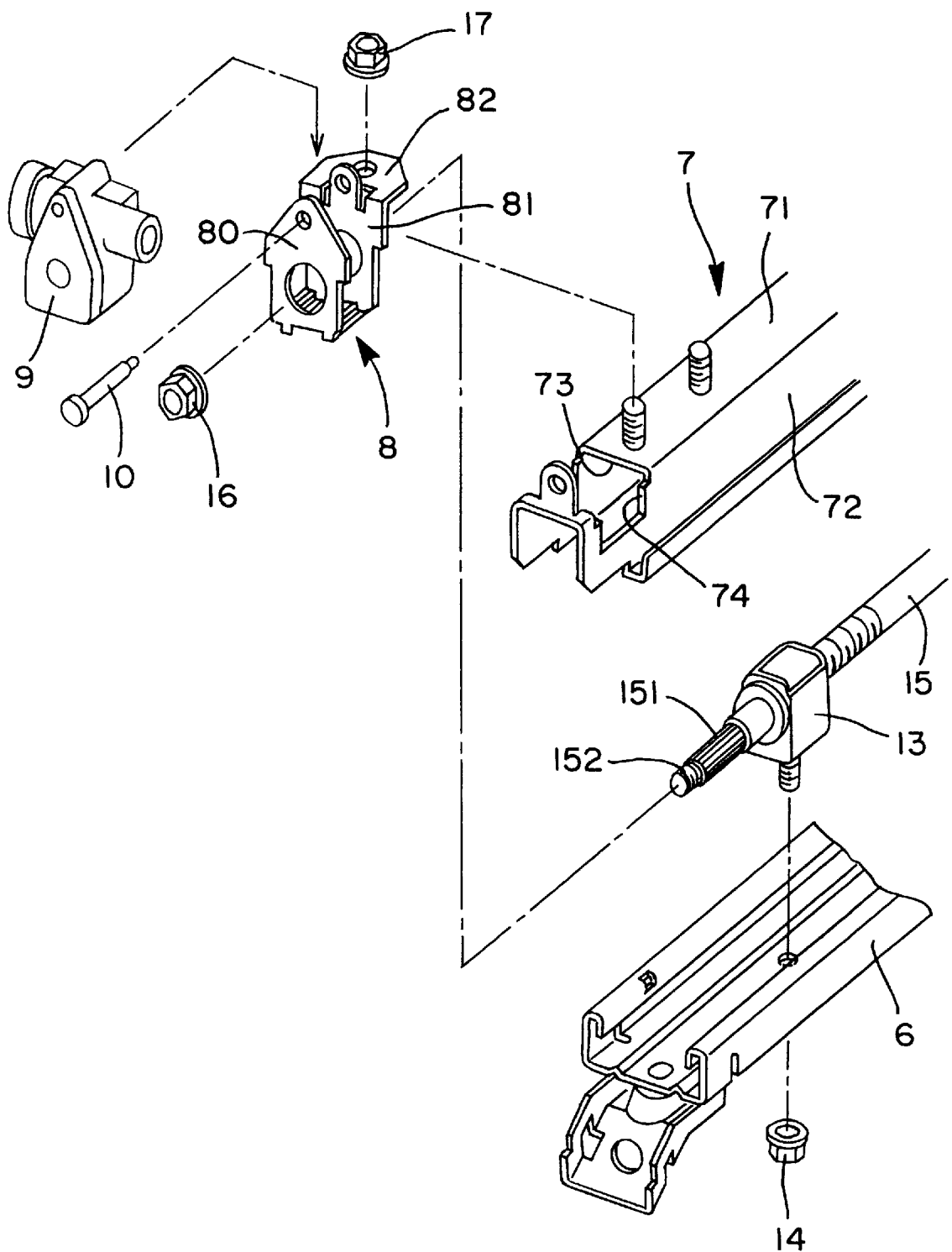
FIG. 1 is an exploded perspective view showing an essential portion of a seat slide device according to a first embodiment of the invention.

The embodiments of the invention will be described with reference to the accompanying drawings.

A seat slide device of a first embodiment of the present invention is constructed, as shown in FIGS. 1 to 5, to adjust the position of a seat cushion 1 through a drive unit with respect to a lower rail 6 arranged on the floor portion of a vehicle. An upper rail 7 retains the seat cushion 1 and is movable along the lower rail 6 by an electric motor. The seat slide device comprises a bracket member 8 which has the drive unit arranged therein, which is secured on the upper rail 7 while retaining one end of a screw member 15 arranged movably in the lower rail 6 through a reduction gear mechanism 9 made of a later-described gear box, and which has abutment faces 81 formed to abut against a shoulder portion 74 of the upper rail 7 below the top face of one end of the same.

Figure 2:
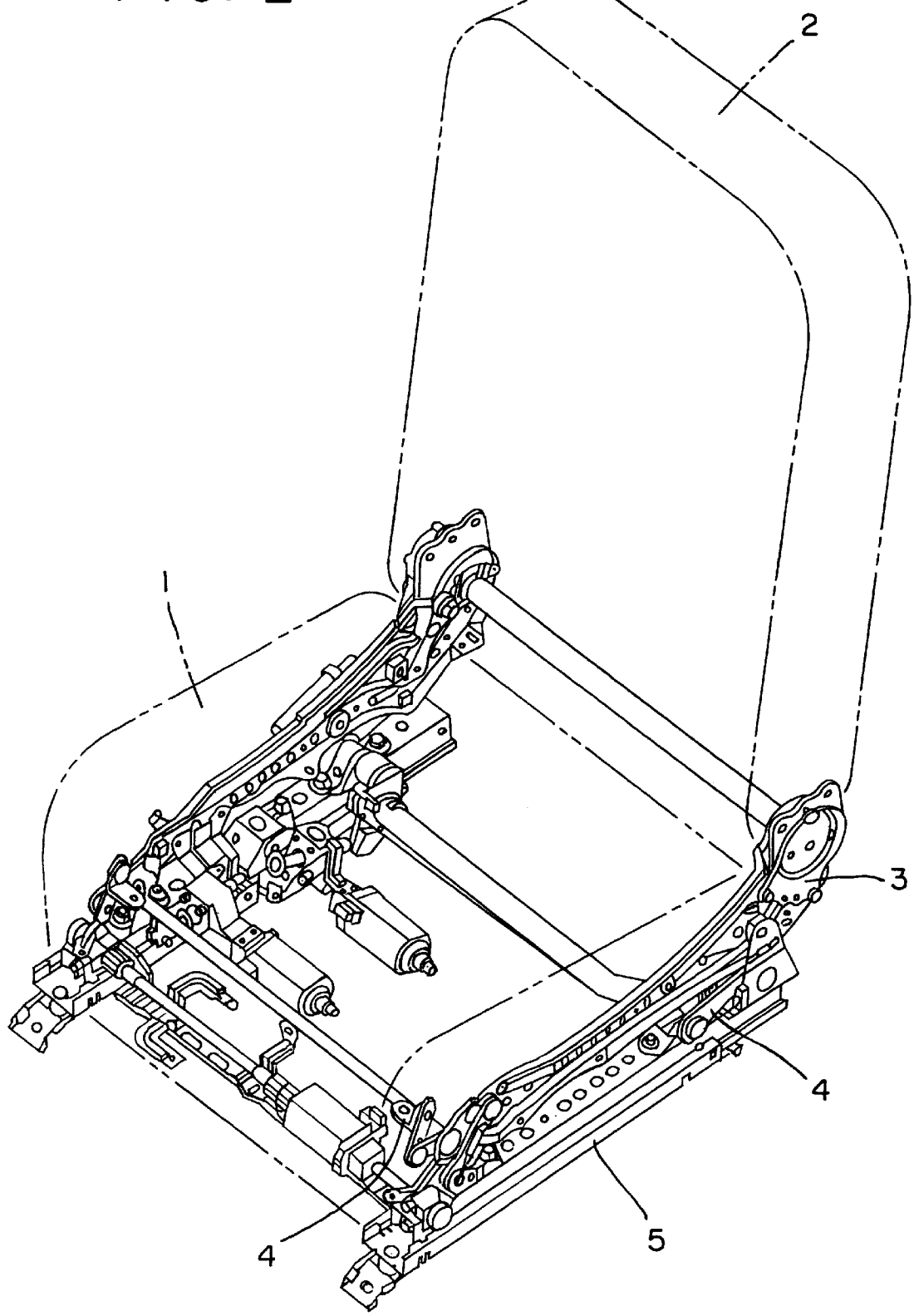
FIG. 2 is a perspective view showing the entirety of a power seat to which the seat slide device of the first embodiment may be applied.
Figure 3:
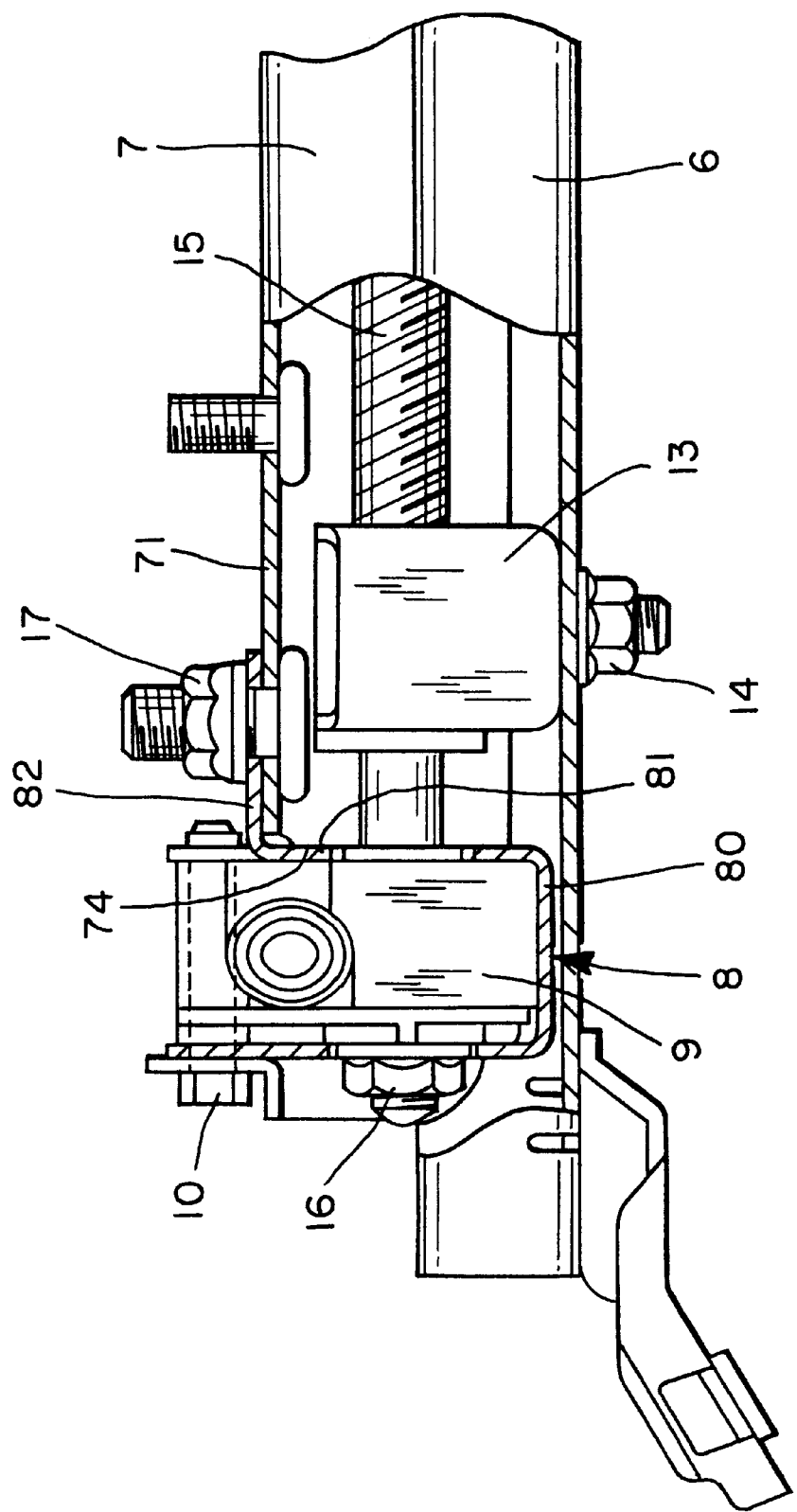
FIG. 3 is a partial section showing the bracket of the device of the first embodiment.
Figure 4:
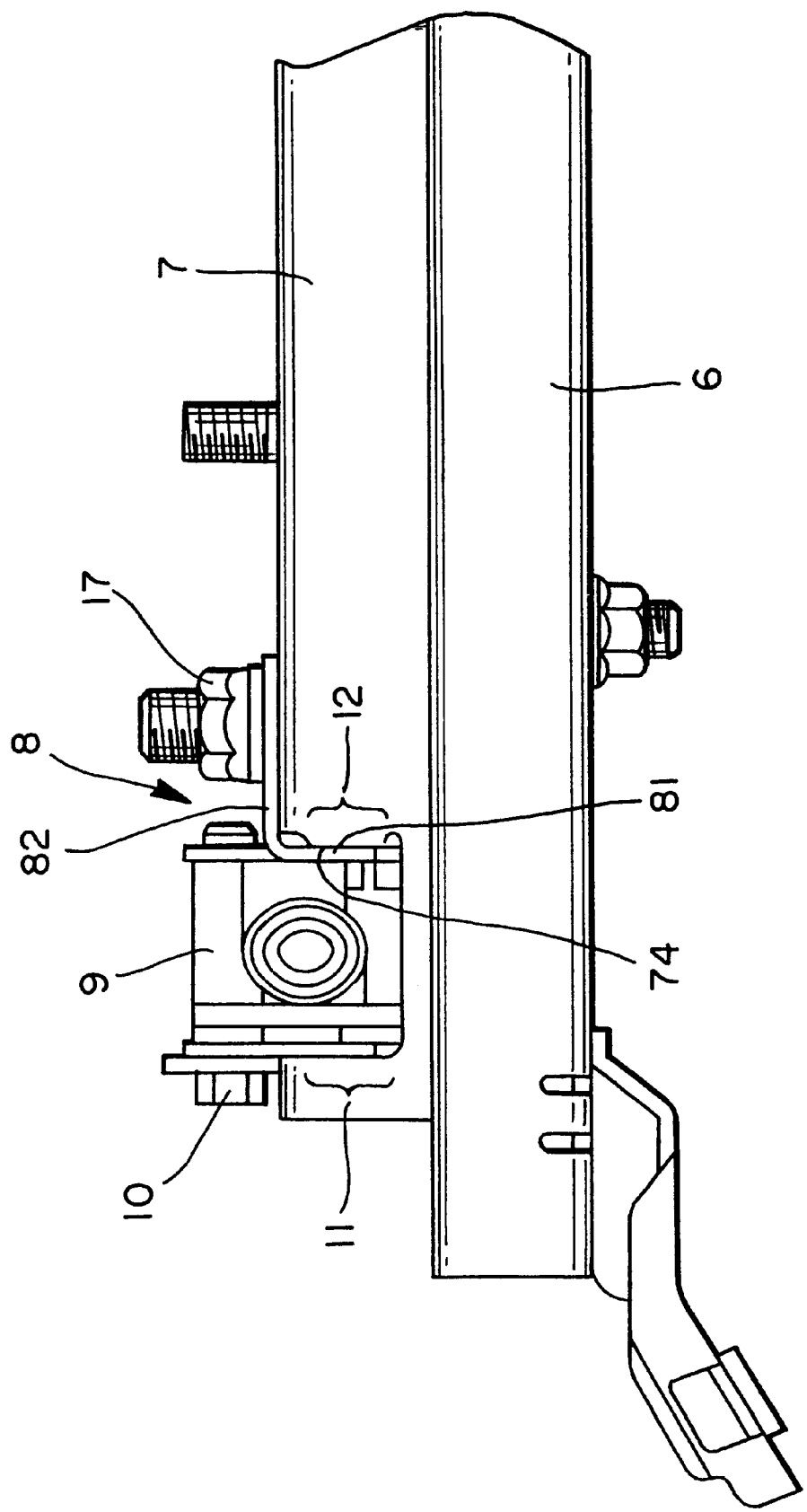
FIG. 4 is a side elevation showing the bracket of the device of the first embodiment.
Figure 5:
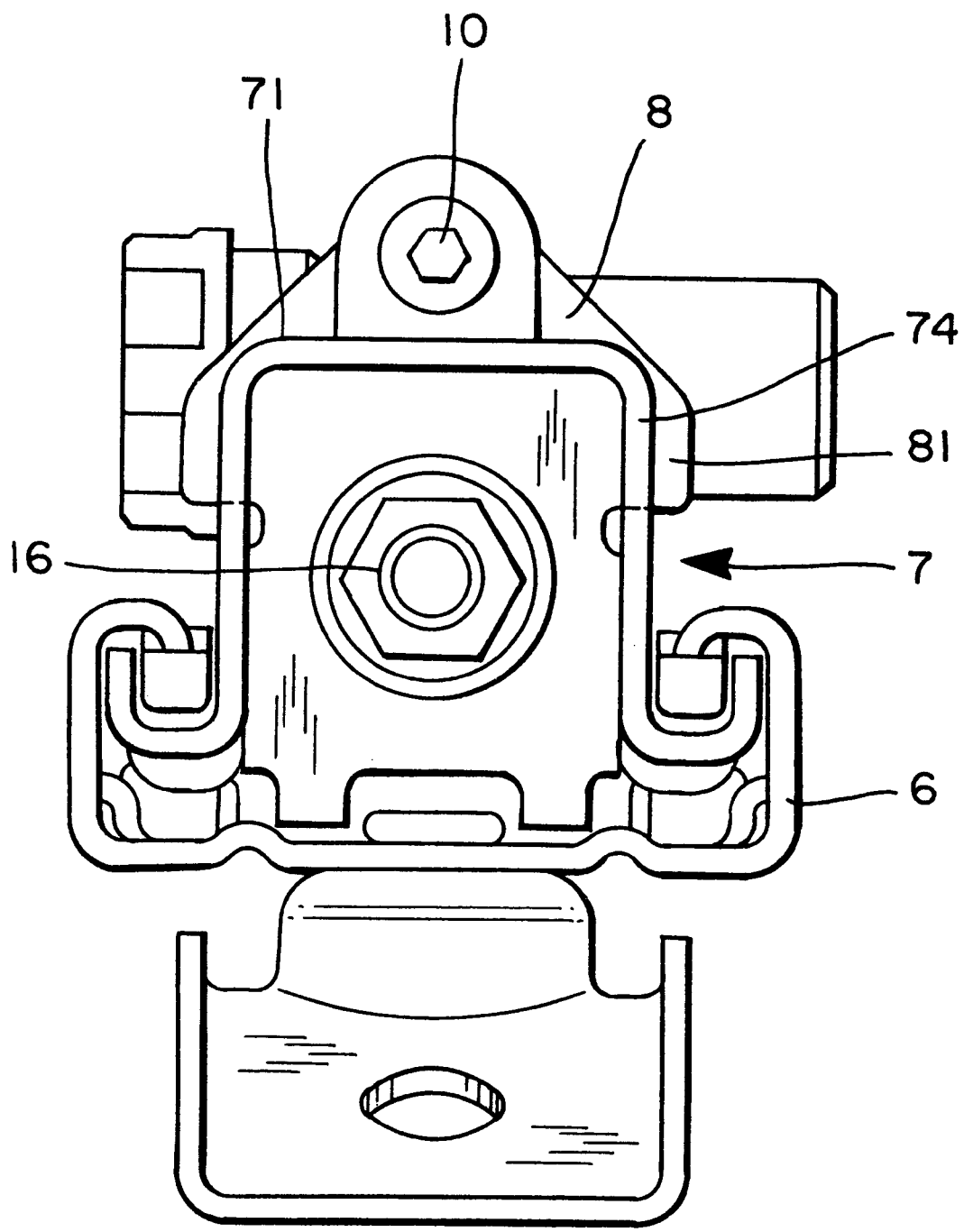
FIG. 5 is a front elevation showing the bracket of the device of the first embodiment.

At the rear portion of the seat cushion 1, as shown in FIG. 2, there is arranged a seat back 2 which can be freely inclined by a seat reclining mechanism 3.

The seat cushion 1 is vertically movable by a seat vertical mechanism 4, and the seat cushion 1 and the seat back 2 are longitudinally movable by a seat slide mechanism 5.

In this seat slide mechanism 5, as shown in FIGS. 1 to 4, a nut member 13 is fixed by a nut 14 on the lower rail 6 which is fixed on the floor portion of a vehicle and which has a generally U-shaped cross-section.

The screw member 15 is so fitted and engaged with the nut member 13 as to freely turn and move in the axial direction so that it is gradually moved back and forth in the axial direction by the nut member 13 as it turns.

The upper rail 7 is of an inverted, generally U-shaped cross-section and is so slidably mounted on the lower rail 6 that it can move along the lower rail 6 while carrying the seat cushion 1.

The one shoulder portion 74, which constructs an opening 73 formed of a top face 71 and two side walls 72 at one end of the upper rail 7, is made to abut against the vertical wall faces 81 forming the bracket member 8 and acting as the abutment faces. The opening 73 is formed of a rectangular opening which forms a vertical shoulder portion of vertical wall faces and acts as the one shoulder portion 74.

The vertical shoulder portion 74 is formed, as shown in FIGS. 1 to 4, to protrude gradually within a predetermined distance from the top face and to have an inverted, generally J-shaped vertical walls of a predetermined protrusion below the predetermined distance so that it may be formed below and near the screw member 15.

The bracket member 8 is formed into a bracket 80 having a U-shaped section composed of opposed vertical wall faces, and the abutment faces 81 are protruded widthwise to have such a width as to abut against the shoulder portion 74 which is positioned below the top face 71 of the one end of the upper rail 7 and over the screw member 15.

The U-shaped section bracket 80 is horizontally extended at its one end to form a retaining portion 82 which is retained by a bolt 17 on the top face 71 of the upper rail 7.

In the U-shaped section bracket 80, there is arranged the reduction gear mechanism 9 which is constructed of a gear box forming the drive unit and rotationally driven by the electric motor (although not shown). The reduction gear mechanism 9 is fitted by a bolt 10 in an engagement hole which is formed at the upper end of the opposed vertical wall faces.

The reduction gear mechanism 9 is meshed with a serrated portion 151 which is formed on one end of the screw member 15 arranged movably in the lower rail 6, and the screw member 15 is fastened at its tip end 152 on the other vertical wall face of the gear box of the reduction gear mechanism 9 by a nut 16. Here, in one and the other vertical wall faces of the bracket 80, there are formed coaxial through holes to receive the screw member 15 and the nut 16.

In the seat slide device thus constructed according to the first embodiment, the upper rail 7 retaining the seats 1 and 2 thereon is moved along the lower rail 6 which is arranged on the floor portion of the vehicle.

As the electric motor rotates, its rotation is decelerated by the drive unit to turn the screw member 15 at a reduced speed. As this screw member 15 turns, it is gradually moved back and forth in the axial direction by the nut member 13 which is so fitted and engaged therewith as to turn and move in the axial direction thereby to adjust the position of the seat back and forth.

In the seat slide device of the first embodiment, the abutment faces 81, which are formed at the bracket member 8 retained by the upper rail 7 while retaining one end of the screw member 15 arranged movably in the lower rail 6 and having the reduction gear mechanism 9 arranged therein as the drive unit, are made to abut against the shoulder portion 74 of the upper rail 7. As a result, when a high load acts with an impact such as collision, the abutment faces 81 formed at the bracket member 8 come into abutment against the shoulder portion 74 below the top face 71 of the one end of the upper rail 7 thereby to exert the load to the upper rail 7 through the shoulder portion 74. As a result, the distance to be contained between the load to act on the upper rail 7 and the load to act on the screw member 15 is made shorter than that of the device of the prior art so that the bending moment to act on the bracket is reduced to make it unnecessary to thicken the bracket or to change the strength enhancing shape of the same. Thus, there is achieved an effect to prevent the large size and the high cost of the bracket.

In the seat slide device of the first embodiment, on the other hand, the one shoulder 74, as constructing the rectangular opening 73 formed on the top face 71 and the two side walls 72 at one end of the upper rail 7, and the vertical wall faces 81, as constructing the bracket member 8, are made to abut against each other. As a result, the vertical wall faces 81 of the bracket member 8 at an angle approximate the right angle with respect to the direction for the load to act on the upper rail 7 abut against the one shoulder 74. Thus, there is achieved an effect to make it possible to transfer the load reliably.

In the seat slide device of the first embodiment, the vertical shoulder portion is formed, as shown in FIG. 1, to protrude gradually within the predetermined distance from the top face of the upper rail 7 and to have an inverted, generally J-shaped vertical walls of a predetermined protrusion below the predetermined distance. As a result, the upper rail 7 is made to abut against the bracket member 8 by the vertical walls of the lower portions near the screw member 15, to make the load to act on the upper rail 7, which approximates to the load to act on the screw member 15. Thus, there is achieved an effect to reliably reduce the bending moment to act on the bracket.

In the seat slide device of the first embodiment, on the other hand, the opening 73 is constructed of the rectangular opening which is formed of the vertical shoulder portion 74 made of the vertical wall faces, and the bracket member 8 is constructed of the U-shaped section bracket member 80 having the vertical wall faces 81. As a result, the vertical wall faces 81 of the U-shaped section bracket 80, as being perpendicular to the load to act on the upper rail 7, abuts against the one vertical shoulder portion 74 of the upper rail 7. Thus, there is achieved an effect to make it possible to transmit the load more reliably.

In the seat slide device of the first embodiment, moreover, the retaining portion 82, as formed by extending one end of the U-shaped section bracket 80 horizontally, is retained on the top face 71 of the upper rail 7. As a result, there is achieved an effect to ensure the retention of the U-shaped section bracket 80 on the upper rail 7.

Figure 6:
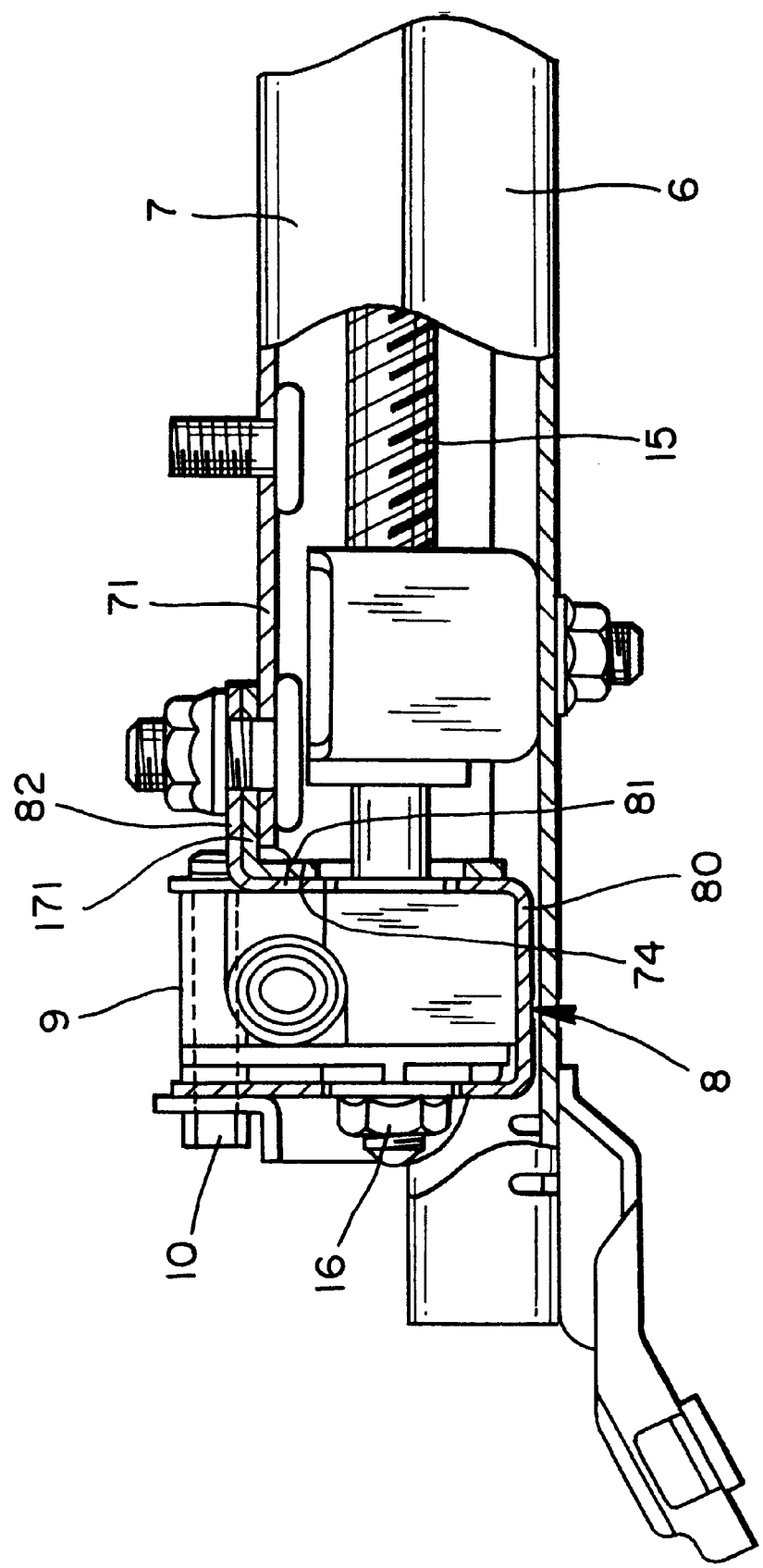
FIG. 6 is a partially sectional view showing the bracket of a device of a second embodiment of the invention.
Figure 7:
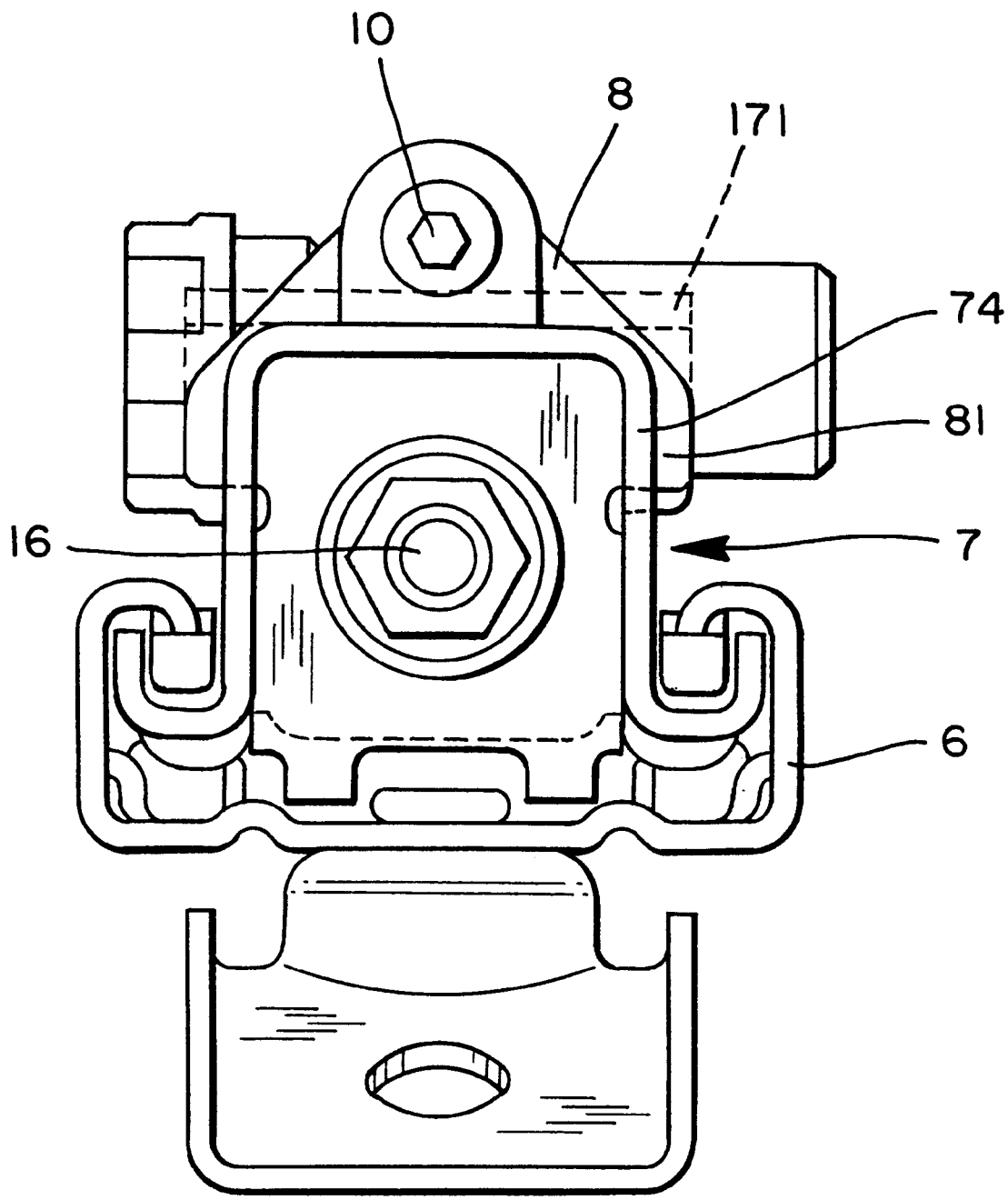
FIG. 7 is a front elevation showing the bracket of the device of the second embodiment.
Figure 8:
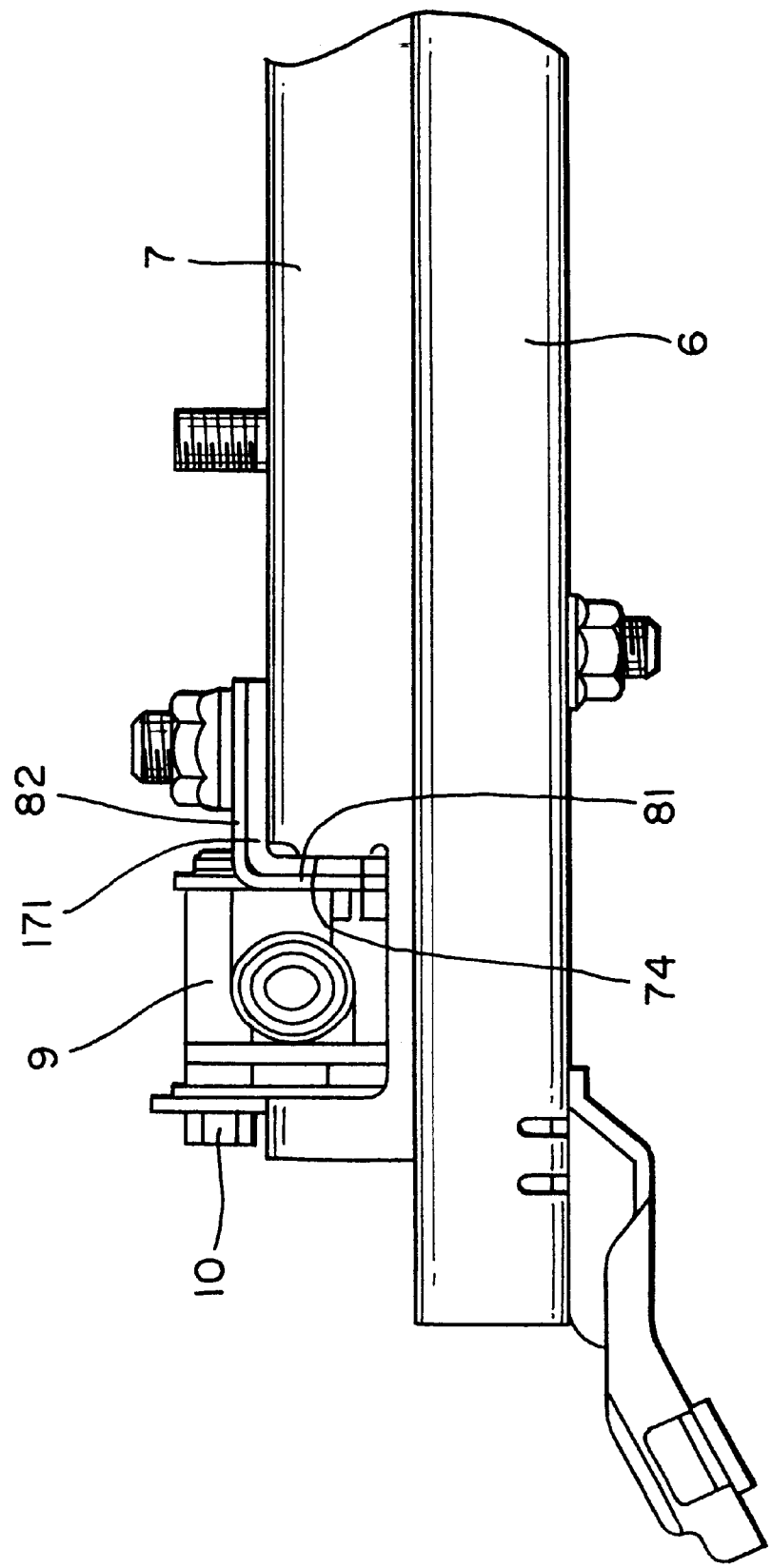
FIG. 8 is a side elevation showing the bracket of the device of the second embodiment.

A seat slide device of a second embodiment is different, as shown in FIGS. 6 to 8, from that of the first embodiment in that an L-shaped section reinforcing member 171 is additionally interposed between the vertical wall faces 81 and the retaining portion 82 of the U-shaped section bracket 80 and the vertical shoulder portion 74 and the top face 71 of the upper rail 7, as will be described only on the difference.

In the seat slide device thus constructed according to the second embodiment, the L-shaped section reinforcing member 171 is interposed between the vertical wall faces 81 and the retaining portion 82 of the U-shaped section bracket 80 and the vertical shoulder portion 74 and the top face 71 of the upper rail 7. As a result, the U-shaped section bracket 80 is reinforced.

In the seat slide device of the second embodiment for the aforementioned action, the L-shaped section reinforcing member 171 is interposed between the U-shaped section bracket 80 and the upper rail 7. Thus there is achieved an effect to reinforce the U-shaped section bracket 80 thereby to enhance the strength of the U-shaped section bracket 80.

Figure 9:
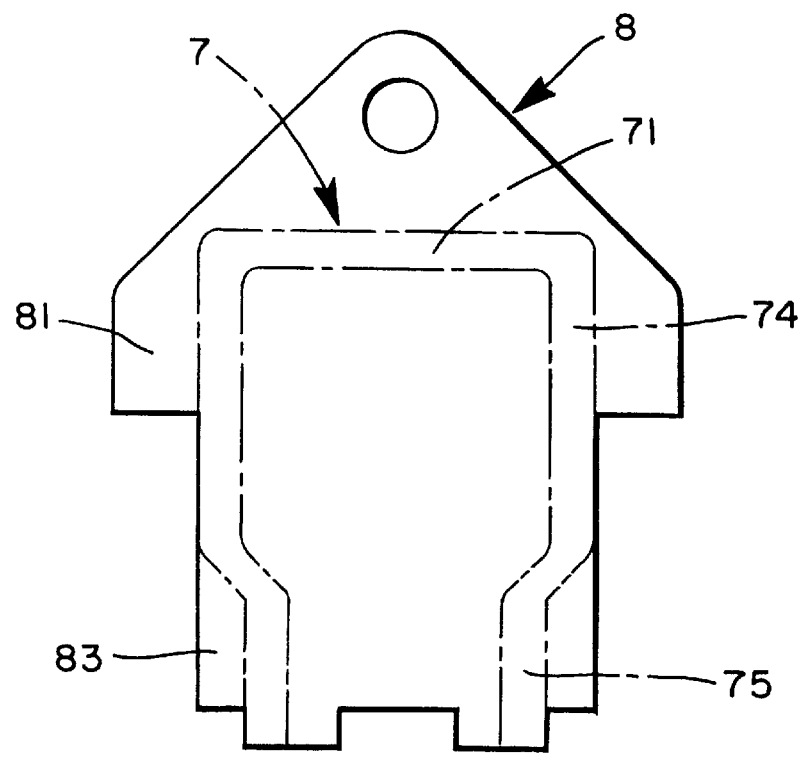
FIG. 9 is a front elevation showing a bracket of a device of a third embodiment of the invention.
Figure 10:
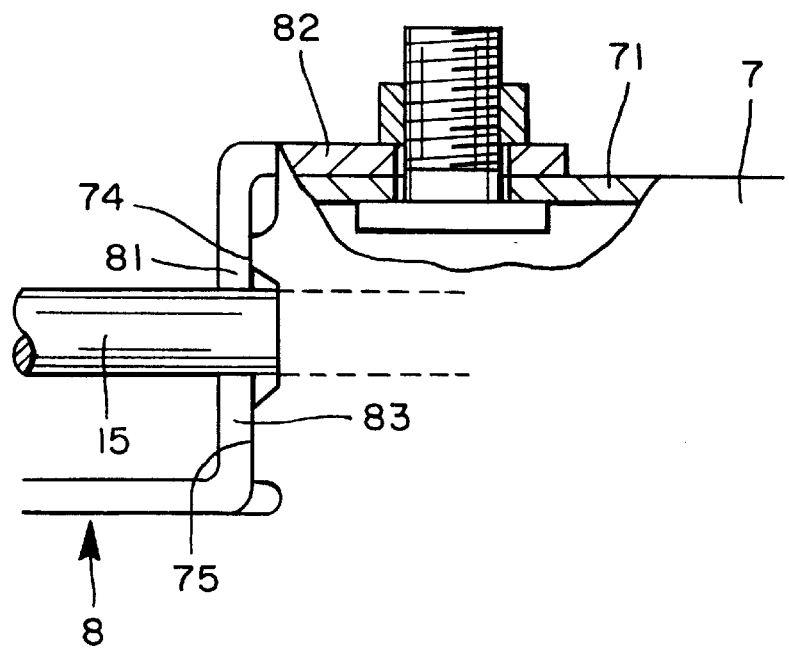
FIG. 10 is a partial section showing the bracket of the device of the third embodiment.
Figure 11:
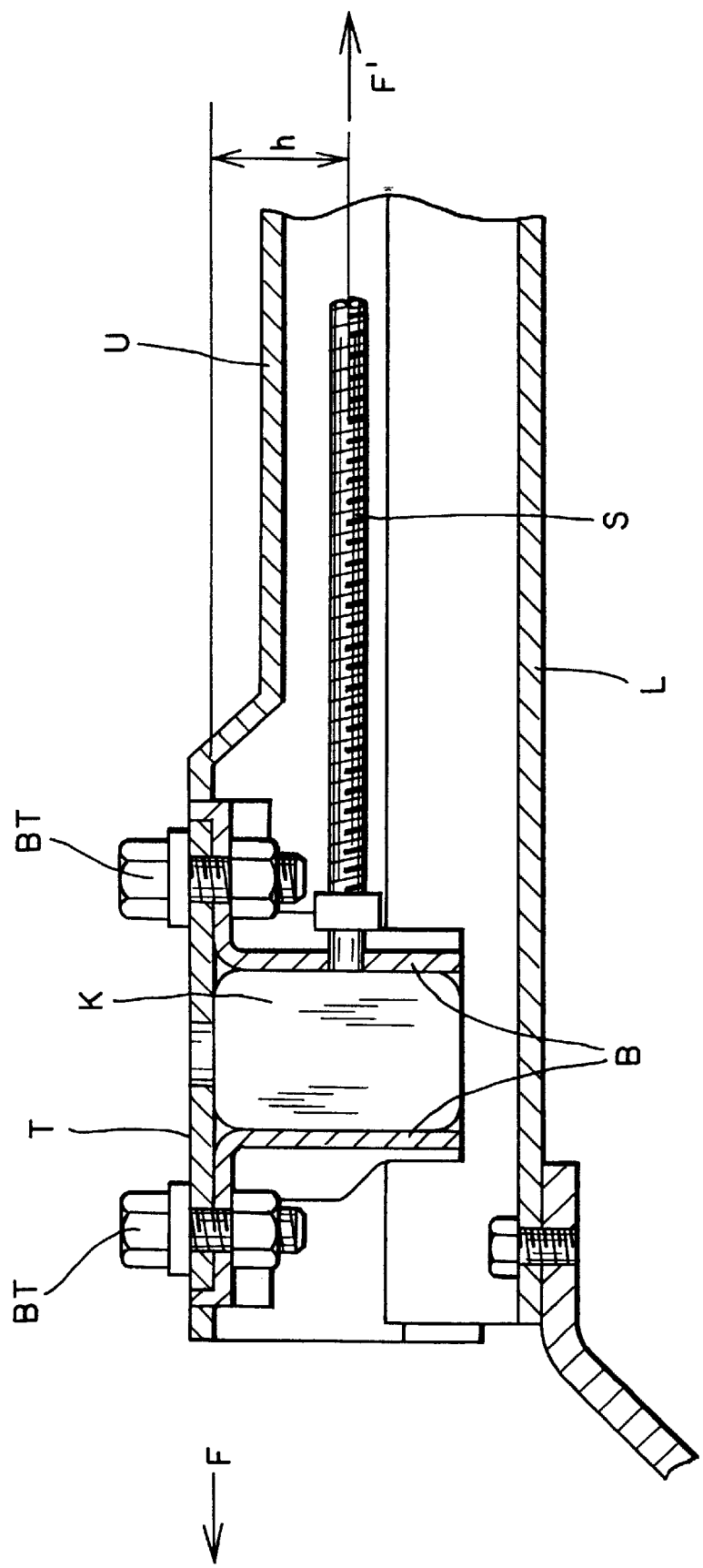
FIG. 11 is a partial section showing the bracket of the seat slide device of the prior art.
Figure 12:
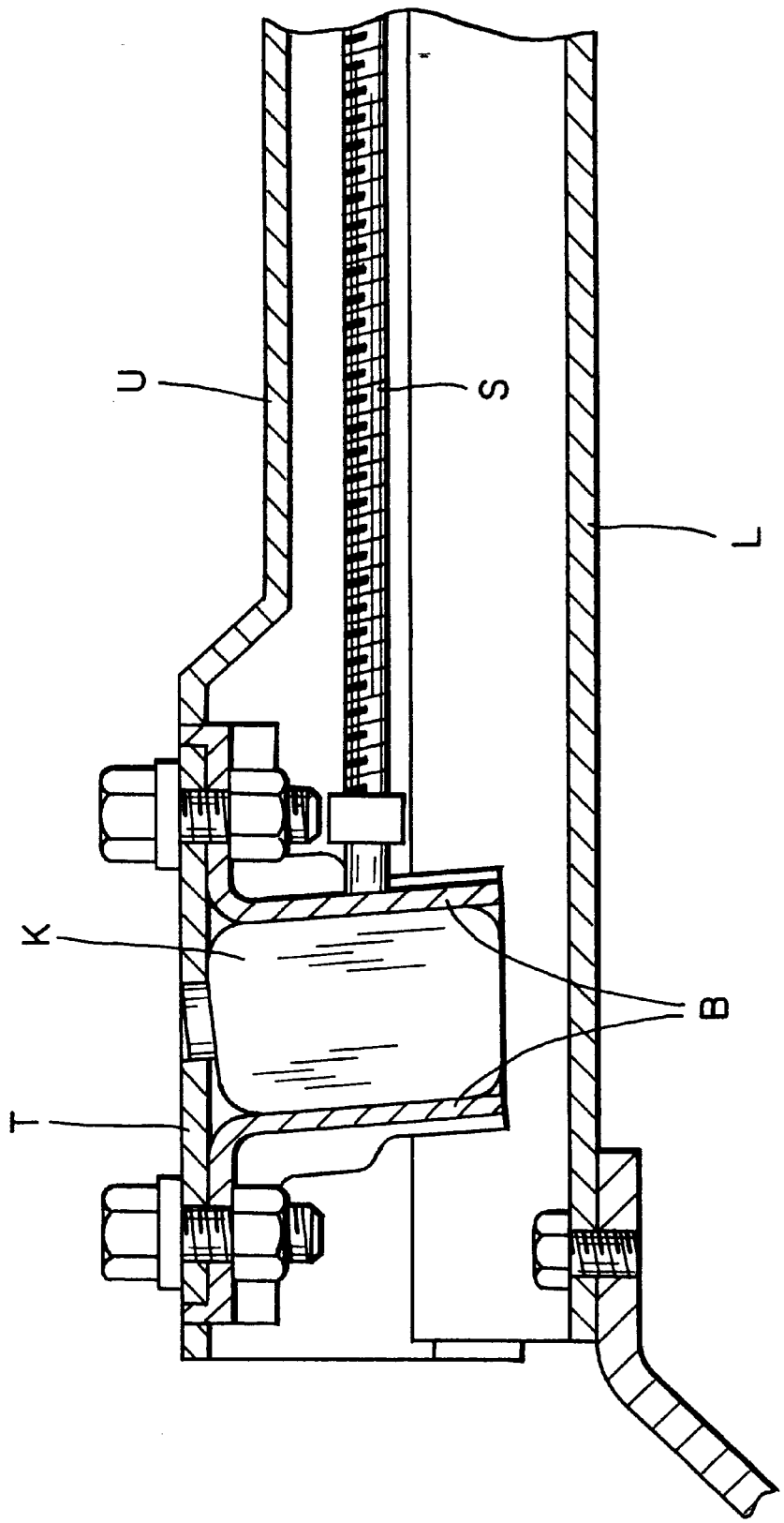
FIG. 12 is a partial section showing the modified state of the bracket of the device of the prior art.

A seat slide device of a third embodiment is made different, as shown in FIGS. 9 and 10, from that of the foregoing first embodiment in that the abutment faces 81 and 83 of the bracket member 8 are made to abut against the upper and lower shoulder portions 74 and 75 of the screw member 15 below the top face 71 of one end of the upper rail 7, as will be described on the difference.

In the seat slide device thus constructed according to the third embodiment, the vertical wall face 81 acting as the abutment face of the bracket member 8 abuts against the upper and lower shoulder portions 74 and 75 of the screw member 15 below the top face 71 of one end of the upper rail 7 thereby to apply the load generally on the axis of the screw member 15.

In the seat slide device of the third embodiment for the aforementioned action, the abutment face 81 is made to abut against the upper and lower shoulder portions 74 and 75 of the screw member 15 below the top face of one end of the upper rail 7. As a result, the distance between the load to act on the upper rail 7 and the load to act on the screw member 15 is reduced substantially to zero. Thus, there is achieved an effect to reduce the bending moment to act on the bracket 8 substantially to zero.

As many apparently widely different embodiments of the present invention can be made without departing from the spirit and scope thereof, it is to be understood that the invention is not limited to the specific embodiments thereof except as defined in the appended claims.

What is claimed is:

1. A seat slide device for vehicles comprising: a lower rail adapted to be arranged on a floor portion of a vehicle body; an upper rail adapted to support a seat and slidable along said lower rail, said upper rail having a top face; a screw member arranged in said lower rail and a nut member disposed on the screw member, said nut member being fixed to the lower rail and the screw member being axially movable relative to the lower rail; a drive unit for sliding said upper rail with respect to said lower rail by axially moving said screw member; and a bracket member supporting said drive unit and retained by said upper rail while retaining one end of said screw member in said lower rail, said bracket member including an abutment wall face for abutting against a shoulder portion which is formed adjacent one end of said upper rail and below the top face of the upper rail; said abutment wall face of said bracket member abutting against the shoulder portion above said screw member; the shoulder portion being formed by an opening on the top face and two side walls adjacent the one end of said upper rail, and the abutment wall face of the bracket member being a vertical wall face of said bracket member.

2. A seat slide device according to claim 1, wherein said opening defines a vertical shoulder portion in the upper rail having vertical wall faces, and said bracket member is constructed as a U-shaped bracket having a pair of vertical wall faces.

3. A seat slide device according to claim 2, wherein said U-shaped bracket includes a horizontally extending portion at one end forming a retaining portion retained on the top face of said upper rail.

4. A seat slide device according to claim 3, including an L-shaped section reinforcing member interposed between one of the vertical wall faces and the retaining portion of said U-shaped bracket and the vertical shoulder portion and the top face of said upper rail.

5. A seat slide device for vehicles for adjusting a position of a seat with respect to a floor of the vehicle comprising: a lower rail adapted to be fixed on the floor of the vehicle; an upper rail slidable along said lower rail, said upper rail having a top surface; power means for driving a screw shaft of a screw-nut member, said screw shaft being positioned within a space of said lower rail and a nut of said screw-nut member being fixedly secured to said lower rail; and a bracket member supporting said power means and retained in an opening defined in one end portion of said upper rail, a side face of said bracket member being made to abut against at least one protruded face of an edge defining said opening at a position below the top surface of the upper rail and above the screw shaft.

6. A seat slide device according to claim 5, wherein said bracket member has a laterally extending portion which is mounted on the top surface of said upper rail.

7. A seat slide device according to claim 6, wherein the side face of said bracket member further abuts against a protruded face along another side edge defining said opening at a position below the screw shaft.

8. A seat slide device for vehicles for adjusting a position of a seat with respect to a floor of the vehicle comprising: a lower rail adapted to be fixed on the floor of the vehicle; an upper rail slidable along said lower rail, said upper rail having a top wall lying in a plane; a screw member positioned within said lower rail and a nut member engaging the screw member, the nut member being adapted to be fixed to the lower rail; power means operatively associated with the screw member for driving the screw member; and a bracket member supporting said power means and retained in an opening formed in the upper rail, one wall face of said bracket member being adapted to abut against at least one protruded portion formed on the upper rail at a location spaced below said plane and above the screw member.

9. A seat slide device according to claim 8, wherein said opening is formed in the top wall of the upper rail.

10. A seat slide device according to claim 8, wherein said opening is formed in the top wall of the upper rail and in opposite side walls of the upper rail.

11. A seat slide device according to claim 8, wherein said opening forms a shoulder portion defining said protruded portion.

12. A seat slide device according to claim 8, wherein the one wall face of the bracket member is a vertical wall face of said bracket member.

13. A seat slide device according to claim 8, wherein said protruded portion is formed as a vertically extending shoulder portion.

14. A seat slide device according to claim 8, wherein said bracket member is a U-shaped bracket member.

15. A seat slide device according to claim 14, wherein said U-shaped bracket member includes a horizontally extending portion at one end forming a retaining portion retained on the top wall of said upper rail.

16. A seat slide device according to claim 8, wherein said upper rail includes a pair of side walls extending from the top wall, said protruded portion being formed on one of the side walls of the upper rail.

* * * * *